(12) United States Patent
Yang et al.

(10) Patent No.: US 8,706,080 B2
(45) Date of Patent: Apr. 22, 2014

(54) CHARGING CORRELATION FOR DEDICATED BEARERS

(75) Inventors: Yong Yang, Molndal (SE); Susana Fernandez Alonso, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/499,749

(22) PCT Filed: Oct. 1, 2010

(86) PCT No.: PCT/EP2010/064642
§ 371 (c)(1),
(2), (4) Date: Apr. 2, 2012

(87) PCT Pub. No.: WO2011/039348
PCT Pub. Date: Apr. 7, 2011

(65) Prior Publication Data
US 2012/0202457 A1    Aug. 9, 2012

Related U.S. Application Data

(60) Provisional application No. 61/247,969, filed on Oct. 2, 2009.

(51) Int. Cl.
*H04M 11/00* (2006.01)
*H04L 1/00* (2006.01)
*G06F 15/173* (2006.01)

(52) U.S. Cl.
USPC ............ 455/406; 370/252; 370/354; 709/223

(58) Field of Classification Search
USPC .................. 455/406; 370/252, 354, 328, 338; 709/223, 228–229
See application file for complete search history.

(56) References Cited

U.S. PATENT DOCUMENTS 7,483,698 B2 * 1/2009 Hurtta .................. 455/432.1
2009/0196231 A1 * 8/2009 Giaretta et al. ............... 370/328
2010/0017846 A1 * 1/2010 Huang et al. ..................... 726/1
2010/0150003 A1 * 6/2010 Andreasen et al. ........... 370/252

FOREIGN PATENT DOCUMENTS

EP        2093931 A1      8/2009
WO   2009006630 A1      1/2009

OTHER PUBLICATIONS

3gpp TS29.212 V8.5.0 (Sep. 2009).*
3gpp TS29.214 V9.0.0 (May 2009).*
"Universal Mobile Telecommunications System (UMTS); LTE; Policy and charging control over Rx reference point (3GPP TS 29.214 version 8.5.0 Release 8)", Technical Specifications Standards Institute (ETSI), 650, Route Des Lucioles, F-06921 Sophia-Antipolis, France, No. V8.5.0, Jun. 1, 2009, 41 pp., XP014044668.

* cited by examiner

*Primary Examiner* — Jinsong Hu
*Assistant Examiner* — William Nealon
(74) *Attorney, Agent, or Firm* — Rothwell, Figg, Ernst & Manbeck, P.C.

(57) ABSTRACT

A Policy and Charging Rules Function, a PCRF (120), for use with a Policy and Charging Enforcement Function, a PCEF (135), over a Gx interface, and arranged to communicate with an Application Function, an AF (110), over an Rx interface. The PCRF (120) is arranged to receive a request from the AF (110) regarding Access Network Charging Correlation Information for the AF, and if such a request is received from the AF, the PCRF (120) checks if the Access Network Charging Correlation Information is known to the PCRF, in which case the PCRF (120) provides the information to the AF (110), and if the Access Network Charging Correlation Information is not known to the PCRF (120), it subscribes to the Access Network Charging Correlation Information from the PCEF (135) and to supply the Access Network Charging Correlation Information to the AF (110) after reception from the PCEF (135).

5 Claims, 3 Drawing Sheets

CHARGING CORRELATION FOR DEDICATED BEARERS

CROSS-REFERENCE TO RELATED APPLICATIONS

This application is a 35 U.S.C. §371 National Phase Entry Application from PCT/EP2010/064642, filed Oct. 1, 2010, and designating the United States, which claims priority to U.S. Application No. 61/247,969, filed Oct. 2, 2009, the entire contents of which are incorporated by reference herein.

TECHNICAL FIELD

The present invention discloses a Policy and Charging Control Function.

BACKGROUND

In cellular system such as, for example, GERAN, UTRAN or E-UTRAN systems, there can be a number of Application Functions, AFs, for use by User Equipments, UEs, in the system.

The cellular system will also comprise a so called Policy and Charging Rules Function, a PCRF, and a Policy and Charging Enforcement Function, a PCEF.

The PCRF is a functional element which encompasses policy control decision and flow based charging control functionalities. The PCRF provides network control regarding the service data flow detection, gating, QoS and flow based charging, with the exception of credit management, to the PCEF.

The PCRF also provides rules for Policy and Charging Control, PCC, to the PCEF via a reference point known as the Gx reference point, also known as the Gx interface.

Charging a UE for the use of a particular AF is carried out on the basis of a charging identifier, an Access Network Charging Identifier, which is assigned by the system to a dedicated bearer which is used for the services provided by the AF to the UE.

SUMMARY

It is a purpose of the present invention to provide a PCRF which can provide an Application Function with the proper Access Network Charging Correlation Identifier in a variety of cases.

This purpose is met by the present invention in that it discloses a Policy and Charging Rules Function, a PCRF, for use with a Policy and Charging Enforcement Function, a PCEF, over a Gx interface.

The PCRF is also arranged to communicate with an Application Function, an AF, over an Rx interface, and is arranged to receive a request from the AF regarding Access Network Charging Correlation Information for the AF.

In the event that such a request is received from the AF, the PCRF is arranged to check if the Access Network Charging Correlation Information is known to the PCRF, in which case the PCRF is arranged to provide the information to the AF, and if the Access Network Charging Correlation Information is not known to the PCRF, the PCRF is arranged to subscribe to the Access Network Charging Correlation Information from the PCEF and to supply the Access Network Charging Correlation Information to the AF after reception from the PCEF.

In one embodiment, the PCRF is arranged to check if the Access Network Charging Correlation Information is known or not to the PCRF by means of checking if the PMIP or the GTP protocol is used between a Serving Gateway and a PDN Gateway, where the Serving Gateway and the PDN Gateway are comprised in a PDN connection for a UE which uses the AF. The PCRF is arranged to interpret use of the PMIP protocol to indicate that the Access Network Charging Correlation Information is known to the PCRF and use of the GTP protocol indicates that it is not.

In one embodiment, the PCRF is arranged to subscribe to the Access Network Charging Correlation Information from the PCEF by means of supplying an event trigger and a charging correlation indicator to the PCEF.

It is also a purpose of the present invention to provide a PCEF which can work together with the PCRF described above.

This purpose is met by the invention by means of disclosing a Policy and Charging Enforcement Function, a PCEF, which is arranged to communicate with a Policy and Charging Rules Function, a PCRF, over a Gx interface. The PCEF is arranged to receive a subscription from the PCRF for an Access Network Charging Identifier for an established dedicated bearer used by a User Equipment, a UE, which accesses the AF, and to supply the PCRF with such an identifier if such a subscription is received.

In one embodiment, the PCEF is arranged to receive the subscription from the PCRF for an Access Network Charging Identifier for an established dedicated bearer in the form of an event trigger and a charging correlation indicator.

BRIEF DESCRIPTION OF THE DRAWINGS

The invention will be described in more detail in the following, with reference to the appended drawings, in which.

DETAILED DESCRIPTION

Figure 1:
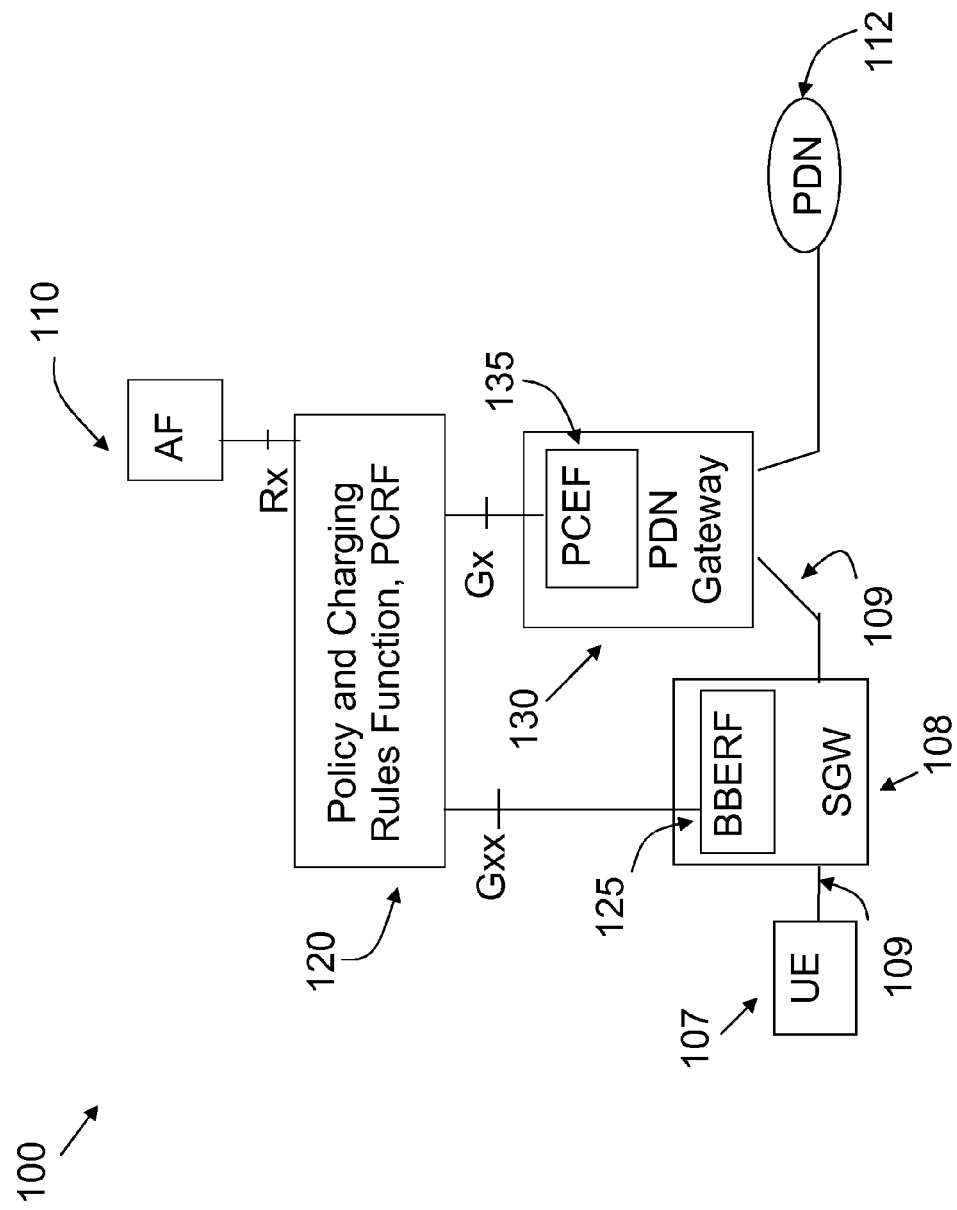
FIG. 1 shows an overview of a system for the invention.

An example of a cellular system 100 in which the invention can be applied is shown in FIG. 1. The cellular system 100 of FIG. 1 can, for example, be a GERAN or an UTRAN or an E-UTRAN system. The architecture of the cellular system 100 supports a PCC, Policy and Charging Control functionality, a functionality which will be explained in more detail below.

As shown in FIG. 1, a User Equipment, a UE 107, can connect to a Packet Data Network, a PDN 112, via a so called Serving Gateway, SGW 108, which in turn connects to a so called PDN Gateway 135. The UE 107 may also subscribe to specific services in the system 100 by means of subscribing to one or more so called Application Functions, AF, one of which is shown as 110 in FIG. 1.

In order to correctly charge the UE for services which the UE subscribes to via the AFs, and to ensure that the UE can access services under the policies which it is allowed, the system 100 comprises a PCRF 120, i.e. a Policy Control and Charging Rules Function, and a PCEF 135, which is a functional element that encompasses policy control decision and flow based charging control functionalities.

The PCRF 120 provides network control regarding, for example, service data flow detection, gating, QoS and flow based charging towards the PCEF. The PCRF receives session and media related information from the AF and informs AF of traffic plane events. The PCRF also provisions PCC Rules to the PCEF via the Gx reference point, which is shown in FIG. 1, sometimes also referred to as the Gx interface.

The PCRF 120 informs the PCEF 135 through the use of PCC rules on the treatment of each service data flow (e.g. as performed by an AF 110 for a UE 107) that is under PCC control, in accordance with the PCRF policy decisions.

Regarding the AF (of which there can be many, but for the sake of clarity only one is shown in FIG. 1), the following can be said: An Application Function is an element in the system 100 which offers applications to UEs in which service is delivered in a different layer (i.e. the so called user plane transport layer) from the one in which the service has originally been requested (i.e. the so called signaling layer) by the UE, with the control of IP bearer resources being distributed according to what has been negotiated in the setup of the application offered by the AF.

One example of an AF is the P-CSCF (Proxy-Call Server Control Function) of the IM CN (IP Multimedia Subsystem Core Network) subsystem. The AF communicates with the PCRF in order to transfer dynamic session information, i.e. descriptions of the media to be delivered in the transport layer. This communication is performed using the Rx interface, which is shown in FIG. 1.

The PCEF 135 is usually, as shown in FIG. 1, comprised in a PDN Gateway 130 used by UEs for accessing a PDN 112, and encompasses service data flow detection, based on filter definitions included in the PCC rules, as well as online and offline charging interactions (not described here) and policy enforcement. Since the PCEF 135 is the function which handles the bearers, it is the function in the system 100 which is the QoS is enforced for a bearer, according to QoS information which the PCEF 135 receives from the PCRF 120. The PDN Gateway 120 in which the PCEF 135 is usually located is the GGSN in the case of GPRS, and the PDG in the case of WLAN case.

Thus, control for a dedicated bearer used by an AF is usually carried out in the PCEF.

The PCC allows charging correlation between the access network and the application layer. For the purpose of charging correlation between service data flow level and application level (e.g. IMS), applicable charging identifiers are passed from the PCEF 135 to the PCRF 120, and from the PCRF 120 to the AF 110, if such identifiers are available.

The Gx interface or reference point includes the access charging information such as Access-Network-Charging-Address and Access-Network-Charging-Identifier-Gx AVPs, which is provided to the PCRF 120 during the IP-CAN (IP Core Access Network) session establishment for the UE and subsequent modification procedures.

The Rx interface between the AF 110 and the PCRF 120 includes the access charging information, i.e. the so called Access Network Charging Identifier AVP, which is provided by the PCRF 120 to the AF 110, if available during the AF session establishment and during the AF session modification, if available, such as, for example, when PMIP is used, and not previously provided. If the AF 110 has subscribed to changes on access network charging information, the PCRF 120 will provide the Specific-Action AVP including the new charging information in the event of a change or modification.

The charging identifier, i.e. the Access Network Charging Identifier AVP, applies on a "per bearer" basis when the interface between the access gateway i.e. in this case the SGW 108, and the PDN Gateway, in this case the PCEF, is based on GTP and on a "per IP-CAN session" basis when the protocol is based on PMIP. The protocol between the SGW 108 and the PDN Gateway 130 cannot be modified during the IP-CAN session lifetime.

How the charging identifier received from the PCEF 135 is sent by the PCRF 120 to the AF 110 for a specific dedicated bearer is at present not specified in the applicable standards.

During IP-CAN session establishment for a UE, the PCEF 135 may provide the PCRF 120 with an access charging identifier. At this point in time, i.e. when the IP-CAN session is being established, the access charging identifier will correspond to the default bearer. If PMIP is used, i.e. in the case of the PMIP-based protocol between gateways, the access charging identifier will remain valid and unique for the entire IP-CAN session. However, this is not the case if GTP is used.

On the other hand, upon request to a PCRF 120 from an AF 110 to establish an AF session, a request which has been triggered by a request from a UE 107 to the AF 110, the PCRF 120 will generate the applicable PCC rules and, depending on the bearer control mode supported by the UE and the network, the PCRF 120 will either push the PCC rules to the PCEF 135 so that it may trigger a network initiated dedicated bearer establishment or it will wait for the request from PCEF 135 upon an UE 107 initiated dedicated bearer establishment.

In case of Network initiated dedicated bearer establishment, which is applicable for E-UTRAN access and UTRAN/GERAN access if Bearer Control Mode is set to NW/UE mode, the PCRF 120 will not be aware of the charging identifier associated to the applicable PCC rule during the dedicated bearer generation. This means that the charging identifier which the PCRF 120 has received during the IP-CAN session establishment is not the one required by the AF 110. Instead, a specific charging identifier associated to the dedicated bearer is needed so that the AF 110 can correlate access and application charging.

Also, when the AF 110 establishes an AF session with the PCRF, the AF 110 can subscribe to the so called Specific Action "Access Network Charging Information Notification". This specific action indicates to the PCRF 120 that the AF 110 is interested in receiving information about the access network charging identifiers for the flows provided in the request, i.e. the request from the AF to set up an AF session over the Rx interface to the PCRF.

However, the mechanism for the PCRF 120 to indicate to the PCEF 135 that for a specific PCC rule, the corresponding AF 110 requires the charging identifier corresponding to the dedicated bearer which carries the AF service is not defined, and without such a mechanism, it is not possible for the AF 110 to obtain the charging identifier that the access network has assigned for a specific service, and accordingly it will not be possible to charge the UE based on the access information.

The invention provides a solution to this problem, i.e. the invention provides a mechanism by means of which an AF can obtain precise information corresponding to the charging identifier assigned by the access network to the dedicated bearer that carries specific services, allowing the proper correlation between the AF charging identifier and the Access Network charging identifier, thus allowing for correct charging of the subscriber.

When an AF such as the AF 110 subscribes to the specific action Charging Correlation exchange from the PCRF 120, the PCRF will check if the applicable scenario is PMIP or GTP, where GTP means that the Gxx interface is deployed between the Serving Gateway 108 which is used in a PDN connection for a UE 107 which uses the AF 110i. In the GTP case, the PCRF 120 will indicate to the PCEF 130 via the corresponding PCC rule definition that the Access Network Charging Identifier for the established dedicated bearer is required. If the bearer is already established, or an already existing bearer is modified, the PCRF 120 will provide the Access Network Charging Identifier, the ANCI, which corresponds to the service information to the AF 110.

In the PMIP case, the PCRF 120 will provide the AF with the Access Network Charging Identifier which it has received during the IP-CAN session establishment.

Figure 2:
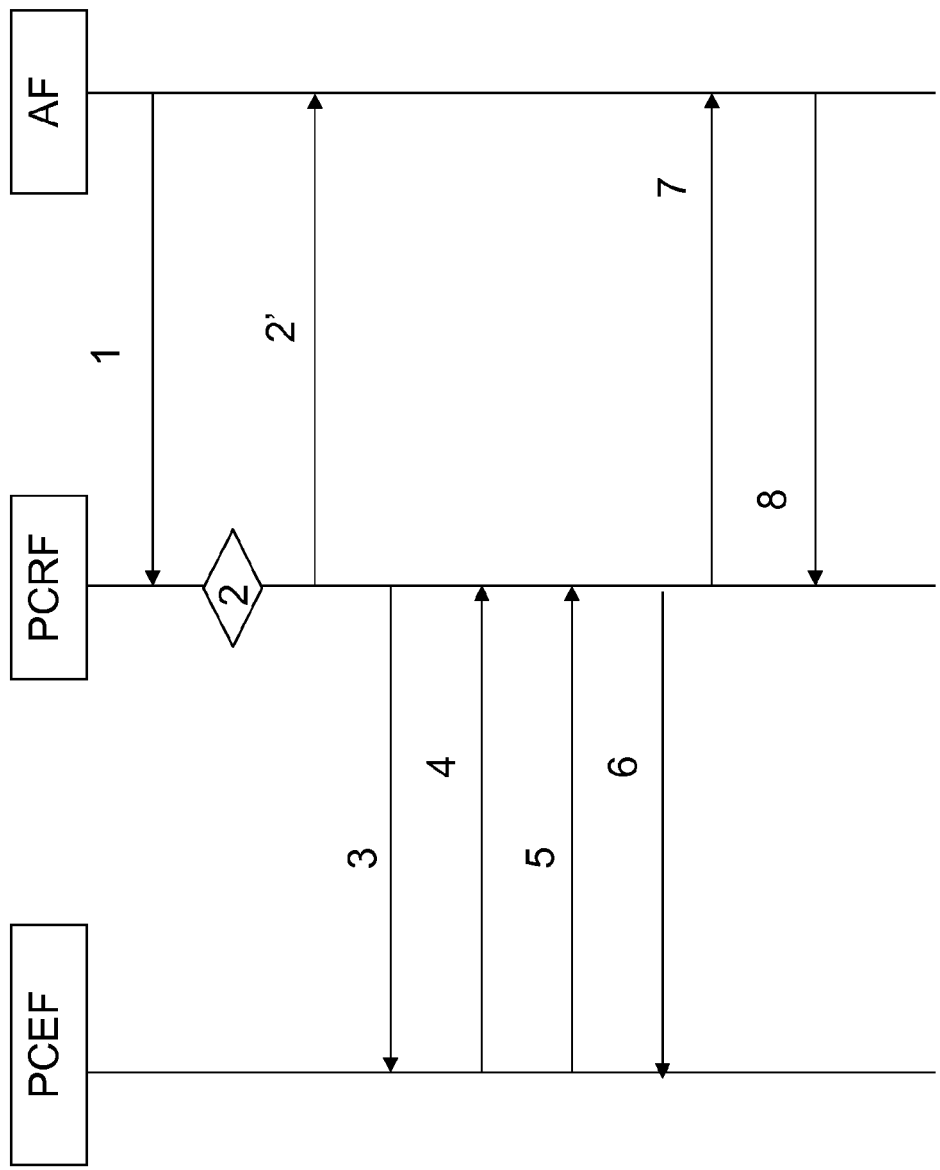
FIG. 2 shows a signaling diagram used in embodiments of the invention.

FIG. 2 shows an example of signaling in the case where an AF needs to be informed of the access network charging identifier which has been assigned to a group of flows, and the service which is provided by the AF 110 and which can be identified by means of the PCC Rule works in the Network initiated mode, which means that the rules have to be immediately downloaded once generated, so that the network initiates the bearer establishment/modification procedure.

The numbers below correspond to the numbers in FIG. 2. The corresponding actions, i.e. the actions taken at each arrow, will be explained in the following. It should be noted that the PCEF of FIG. 2 can either be located in a PDN GW, i.e. a Packet Data Network Gateway, or in a GGSN, depending on the kind of system in which the invention is employed.

1. During AF session establishment, the AF 110 can subscribe to the Specific Action "Charging Correlation Exchange" from the PCRF 120.
2 and 2'. The PCRF 120 authorizes the service information and provides a positive answer, i.e. "ACK", to the AF 110, i.e. the service provided by the AF as requested by a UE is granted. If the scenario is PMIP between the SGW 108 used by the UE 107, and the Charging Correlation Exchange specific action is received from the AF, the PCRF 120 provides the AF 110 with the access charging identifier which it has received during the IP-CAN session establishment.
3. The PCRF 120 creates the PCC rules derived from the service information and decides to download them to the PCEF 135, which I shere. As disclosed by this invention, the PCRF 120 checks if the Charging Correlation Exchange specific action is received from the AF 110 and if the GTP protocol is used between the SGW 108 and the PDN Gateway 130, and if this is the case, the PCRF 120 requests the PCEF 135 to provide the access charging identifier of the dedicated bearer where the PCC rules are being installed. The PCRF 120 creates a flag to indicate that access network charging id is required within the corresponding PCC rule, so that the PCRF 120 is contacted when the bearer has been established. As disclosed herein, a new event is included, suitably named "Charging Correlation Exchange", to request the PCEF 135 to indicate the charging identifier that has been allocated.
4. The PCEF 135 acknowledges to the PDN GW 130, i.e. "ACK".
5. Once the bearer has been successfully established, or modified in the case that there already was an established bearer that fulfilled the QoS demands, the PCEF 135 contacts the PCRF 120 and provides the related dedicated bearer information. As disclosed here, the PCEF 135 also includes the charging information associated with the PCC rules as part of the reported rule information, i.e. the Charging-Rule-Report AVP, together with the Event-Trigger Charging Correlation Exchange in order to allow reporting of more than one charging identifiers if multiple bearers have been established.
6. The PCRF 120 answers positively to the PCEF 135, i.e. "ACK".
7. The PCRF 120 reports the specific action to the AF 110 including the assigned access network identifier to that service or group of flows.
8. The AF 110 acknowledges to the PCRF 120, i.e. "ACK".

Figure 3:
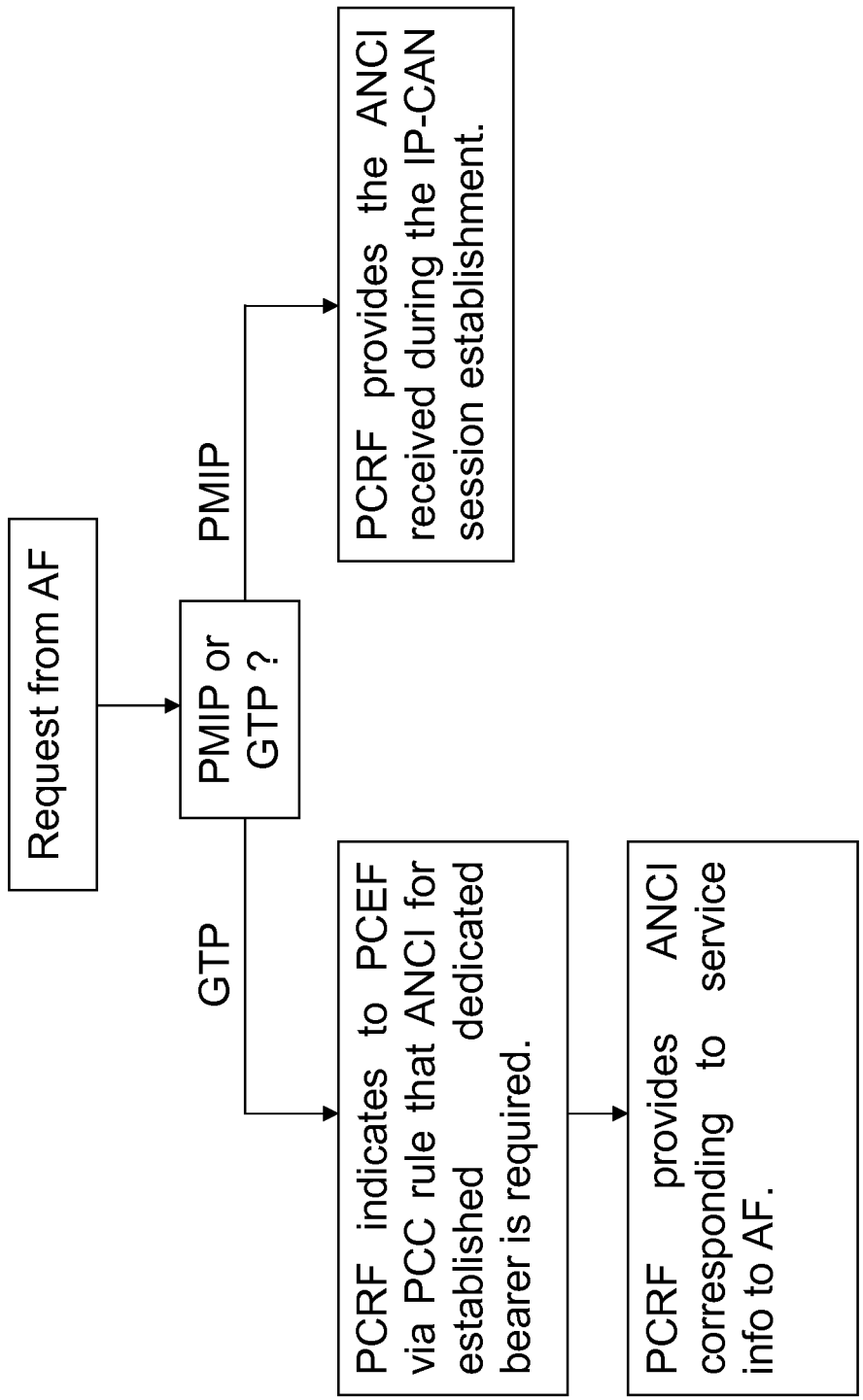
FIG. 3 shows a flow chart used in embodiments of the invention.

FIG. 3 shows a simplified flowchart of a method disclosed in this text: As shown in FIG. 3, when the AF 110 requests Access Network Charging Correlation Information from the PCRF 120, by means of subscribing to the specific action Charging Correlation exchange, the PCRF 120 will check whether the applicable scenario is PMIP or GTP, i.e. if Gxx interface is used between the SGW 108 and the PDN Gateway 130. In the GTP case, the PCRF will indicate the PCEF via the corresponding PCC rule definition that the Access Network Charging Identifier for the established dedicated bearer is required. If the corresponding bearer is already established, or an already existing bearer is modified, the PCRF 120 will provide the Access Network Charging Identifier, ANCI, which corresponds to the service information to the AF 110. In one embodiment, the PCRF 120 provides this to the AF 110 in case it is needed, which the AF indicates by means of a specific action.

In the PMIP case, the PCRF provides the Access Network Charging Identifier received during the IP-CAN session establishment to the AF 110.

ABBREVIATIONS USED IN THIS TEXT

AF: Application Function
ANCI: Access Network Charging Identifier
AVP: Attribute-Value Pair
BBERF: Bearer Binding and Event Reporting Function
GERAN: GSM EDGE Radio Access Network
GGSN: Gateway GPRS Support Node
GPRS: General Packet Radio Service
GSM: Global System for Mobile communications, originally from Groupe Spécial Mobile
EDGE: Enhanced Data Rates for GSM Evolution.
E-UTRAN: Enhanced UTRAN
IM CN: IMS core
IMS: IP Multimedia Subsystem
IP: Internet Protocol
NW: Network
PCC: Policy and Charging Control
PCEF: Policy and Charging Enforcement Function
P-CSCF: Proxy-Call Server Control Function
PCRF: Policy and Charging Rules Function
PDG: Packet Data Gateway
PMIP: Proxy Mobile IP
QoS: Quality of Service
UE: User Equipment
UMTS: Universal Mobile Telecommunications System
UTRAN: UMTS Terrestrial Radio Access Network
WLAN: Wireless Local Area Network Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A Policy and Charging Rules Function (PCRF) operable to communicate with a Policy and Charging Enforcement Function (PCEF) over a Gx interface and operable to communicate with an Application Function (AF) over an Rx interface, the PCRF further being:
   operable to receive a request from the AF regarding Access Network Charging Correlation Information for the AF;
   configured such that, in response to receiving said request from the AF, the PCRF determines whether Access Network Charging Correlation Information is known to the PCRF; and
   configured such that, as a result of the PCRF determining that said Information is known to the PCRF, the PCRF provides said Information to the AF, otherwise, as a result of the PCRF determining that said Information is not known to the PCRF, the PCRF subscribes to said Information from the PCEF and provides said Information to the AF after reception of said Information from the PCEF.

2. The PCRF of claim 1, wherein the PCRF is arranged to check if the Access Network Charging Correlation Information is known or not to the PCRF by checking if the Proxy Mobile IP (PMIP) or a Gxx interface is used between a Serving Gateway and a packet data network (PDN) Gateway, where the Serving Gateway and the PDN Gateway are comprised in a PDN connection for a UE which uses the AF, where use of the PMIP protocol indicates that the Access Network Charging Correlation Information is known to the PCRF and use of the Gxx interface indicates that it is not.

3. The PCRF of claim 1, wherein the PCRF is arranged to subscribe to the Access Network Charging Correlation Information from the PCEF by supplying an event trigger and a charging correlation indicator to the PCEF.

4. A Policy and Charging Enforcement Function (PCEF) arranged to communicate with a Policy and Charging Rules Function (PCRF) over a Ox interface, the PCEF being arranged to receive a subscription from the PCRF for an Access Network Charging Identifier for an established dedicated bearer used by a User Equipment, a UE, which accesses the AF, and to supply the PCRF with such an identifier if such a subscription is received.

5. The PCEF of claim 4, wherein the PCEF is arranged to receive said subscription from the PCRF in the form of an event trigger and a charging correlation indicator.

* * * * *

UNITED STATES PATENT AND TRADEMARK OFFICE
CERTIFICATE OF CORRECTION

| | |
|---|---|
| PATENT NO. | : 8,706,080 B2 |
| APPLICATION NO. | : 13/499749 |
| DATED | : April 22, 2014 |
| INVENTOR(S) | : Yang et al. |

Page 1 of 1

It is certified that error appears in the above-identified patent and that said Letters Patent is hereby corrected as shown below:

In the Specification

In Column 2, Line 52, delete "PDN Gateway 135." and insert -- PDN Gateway 130. --, therefor.

In Column 3, Line 33, delete "PDN Gateway 120" and insert -- PDN Gateway 130 --, therefor.

In Column 4, Line 63, delete "PCEF 130" insert -- PCEF 135 --, therefor.

In the Claims

In Column 8, Line 33, in Claim 4, delete "Ox" and insert -- Gx --, therefor.

Signed and Sealed this
Second Day of September, 2014

Michelle K. Lee
*Deputy Director of the United States Patent and Trademark Office*